United States Patent
DeLuga et al.

(10) Patent No.: US 6,757,166 B2
(45) Date of Patent: Jun. 29, 2004

(54) SYSTEM AND METHOD FOR MULTISTAGE SECURITY OF PORTABLE COMPUTING DEVICE AND ATTACHABLE EXPANSION DEVICE

(75) Inventors: Ronald E. DeLuga, Spring, TX (US); Earl W. Moore, Cypress, TX (US); Robert C. Hurbanis, Jr., Tomball, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 10/167,138

(22) Filed: Jun. 11, 2002

(65) Prior Publication Data

US 2003/0227744 A1 Dec. 11, 2003

(51) Int. Cl.[7] ................................................ G06F 1/16
(52) U.S. Cl. ..................... 361/686; 248/553; 312/223.1; 70/58
(58) Field of Search ................................. 361/683, 686, 361/724–727; 248/552, 553; 312/223.1, 223.2, 223.3; 70/14, 57, 58, 32–34

(56) References Cited

U.S. PATENT DOCUMENTS 5,995,366 A * 11/1999 Howell et al. .............. 361/686
6,088,229 A * 7/2000 Seto et al. ..................... 70/58
6,264,488 B1 * 7/2001 Helot et al. ................. 361/686
6,275,378 B1 * 8/2001 Lee et al. .................... 361/686
6,442,984 B1 * 9/2002 Katoh et al. ................... 70/58
6,522,533 B1 * 2/2003 Ikeuchi et al. .............. 361/686
6,570,758 B1 * 5/2003 Maeda ........................ 361/686

FOREIGN PATENT DOCUMENTS

JP          10-171552      * 12/1996

* cited by examiner

Primary Examiner—Lisa Lea-Edmonds

(57) ABSTRACT

The present technique provides a multistage security system and method for physically securing a portable computing device and an attachable expansion device together or separately to an external fixture, such as a desk. A security structure, such as an internal lock structure, is disposed in one of the portable computing device and the attachable expansion device. An external device-to-fixture fastener is interlockable with the security structure in one of a plurality interlock stages, which facilitate separate or joint security of the portable computing device and the attachable expansion device using the one security structure. For example, the security structure may have first and second lock slots to lock the attachable expansion device to the external fixture, while the second lock slot also has an internal trigger mechanism to interlock the portable computing device to the attachable expansion device. One such trigger mechanism is a lockdown structure operably coupled to the docking mechanism of the attachable expansion device.

41 Claims, 5 Drawing Sheets

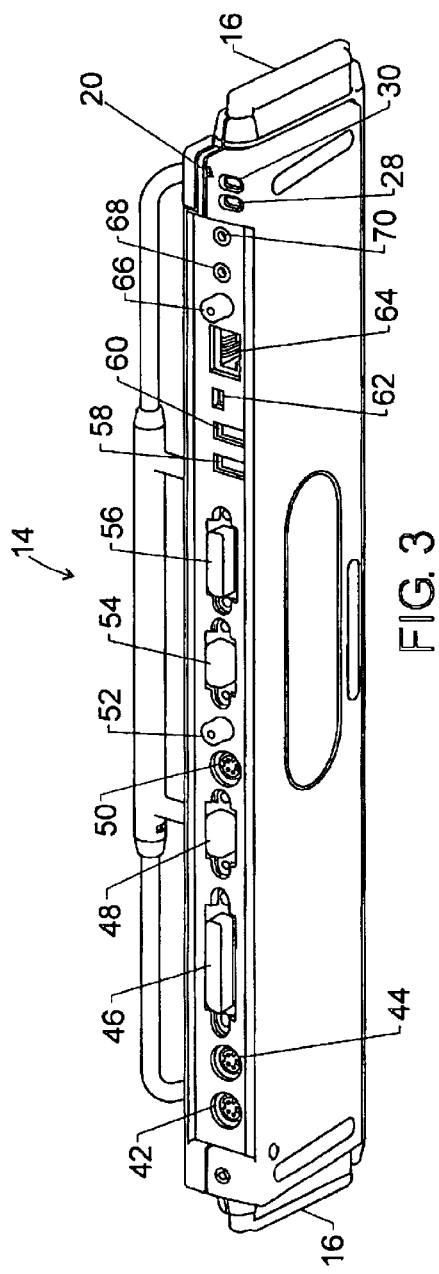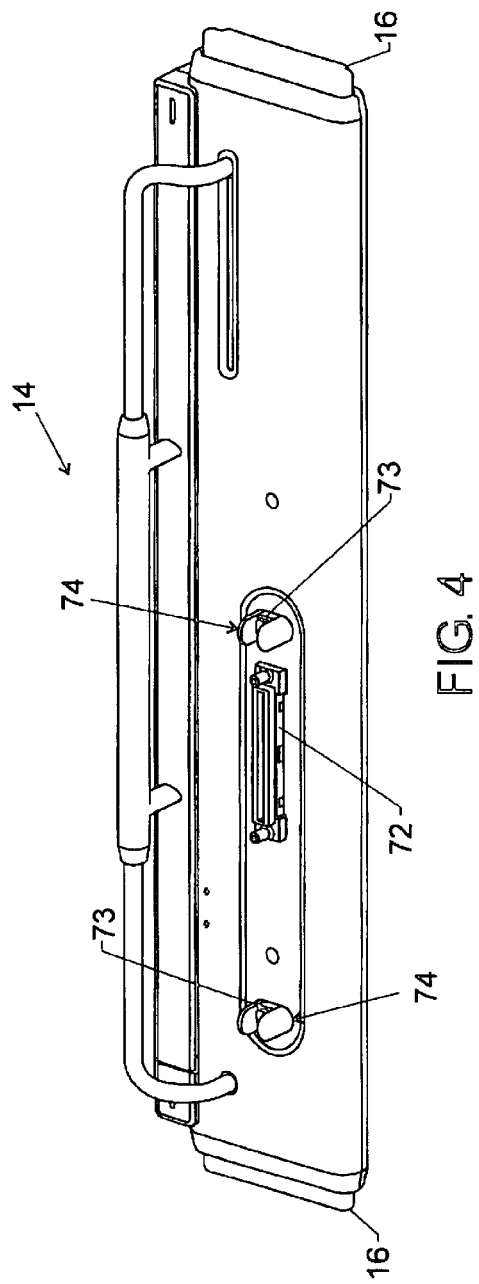

SYSTEM AND METHOD FOR MULTISTAGE SECURITY OF PORTABLE COMPUTING DEVICE AND ATTACHABLE EXPANSION DEVICE

FIELD OF THE INVENTION

The present technique relates generally to computer systems and, more particularly, to security systems for a portable computer system. The present technique provides a multistage security system and method for physically securing a portable computing device and an attachable expansion device together or separately to an external fixture, such as a desk.

BACKGROUND OF THE INVENTION

This section is intended to introduce the reader to various aspects of art, which may be related to various aspects of the present invention described and/or claimed below. The discussion is believed to be helpful in providing the reader with background information to facilitate a better understanding of the various aspects of the present invention. Accordingly, it should be understood that these statements are to be read in this light, and not as admissions of prior art.

Portable computers and other compact electronics are highly vulnerable to unauthorized access and theft. Accordingly, various security systems exist for electronically securing the software and data resources to prevent unauthorized access. For example, many computer systems prompt a user to enter an identification and password to gain access to the software and data resources. Encryption, and special passwords, also may be used to protect data. Physical security systems also exist for physically securing the device to prevent theft. Physical security is generally provided by cable-based lock systems, such as Kensington locks, which provide an attachment structure on the computer that is interlockable with a cable. The cable may be looped around any suitable fixture near the computer. Unfortunately, existing security devices must be disposed on each individual component to fully secure the computer system. A docking station or port replicator for a portable computer must be secured separately from the portable computer. For example, two separate Kensington locks must be used to secure both the portable computer and its docking station or port replicator. This requires twice the material for the manufacturer and twice the work for the user.

Accordingly, a technique is needed for a multistage security system and method for physically securing a portable computing device and an attachable expansion device together or separately to an external fixture, such as a desk.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present technique provides a multistage security system and method for physically securing a portable computing device and an attachable expansion device together or separately to an external fixture, such as a desk. A security structure, such as an internal lock structure, is disposed in one of the portable computing device and the attachable expansion device. An external device-to-fixture fastener is interlockable with the security structure in one of a plurality interlock stages, which facilitate separate or joint security of the portable computing device and the attachable expansion device using the one security structure. For example, the security structure may have first and second lock slots to lock the attachable expansion device to the external fixture, while the second lock slot also has an internal trigger mechanism to interlock the portable computing device to the attachable expansion device. One such trigger mechanism is a lockdown structure operably coupled to the docking mechanism of the attachable expansion device.

BRIEF DESCRIPTION OF THE DRAWINGS

Exemplary embodiments will hereafter be described with reference to the accompanying drawings, wherein like reference numerals denote like elements, and:

FIG. 3 is a rear perspective view of an exemplary attachable expansion device having the multistage security mechanism;

FIG. 4 is a front perspective view of the attachable expansion device;

DETAILED DESCRIPTION OF SPECIFIC EMBODIMENTS

The present technique is directed toward a multistage security system and method for physically securing a portable computing device and an attachable expansion device together or separately to an external fixture, such as a desk. The present technique may be utilized in a variety of displays, portable computers and electronics, and various other device benefiting from physical security of one or more components of the device. Certain aspects of the present technique have been incorporated into a computer system 10, which comprises a portable computing device 12 and an attachable expansion device 14, as illustrated by FIG. 1.

The portable computing device 12 may be a notebook computer, a laptop computer, a handheld/palm computer, a tablet computer, or any other dockable portable device. Accordingly, the portable computing device 12 may comprise a variety of computing components, such as a motherboard, one or more processors, random access memory (RAM), one or more hard disk drives, a floppy disk drive, a CD/DVD drive, a network card, a modem, a keyboard, a pointing device (e.g., a touch pad), communication ports, a display screen, and a variety of other circuitry and components. The attachable expansion device 14 may be a port replicator, a docking station, or any other such docking device having a variety of expansion components. For example, the attachable expansion device 14 may include communication ports, PCMCIA card slots, network support, and various other circuitry and components.

Figure 1:
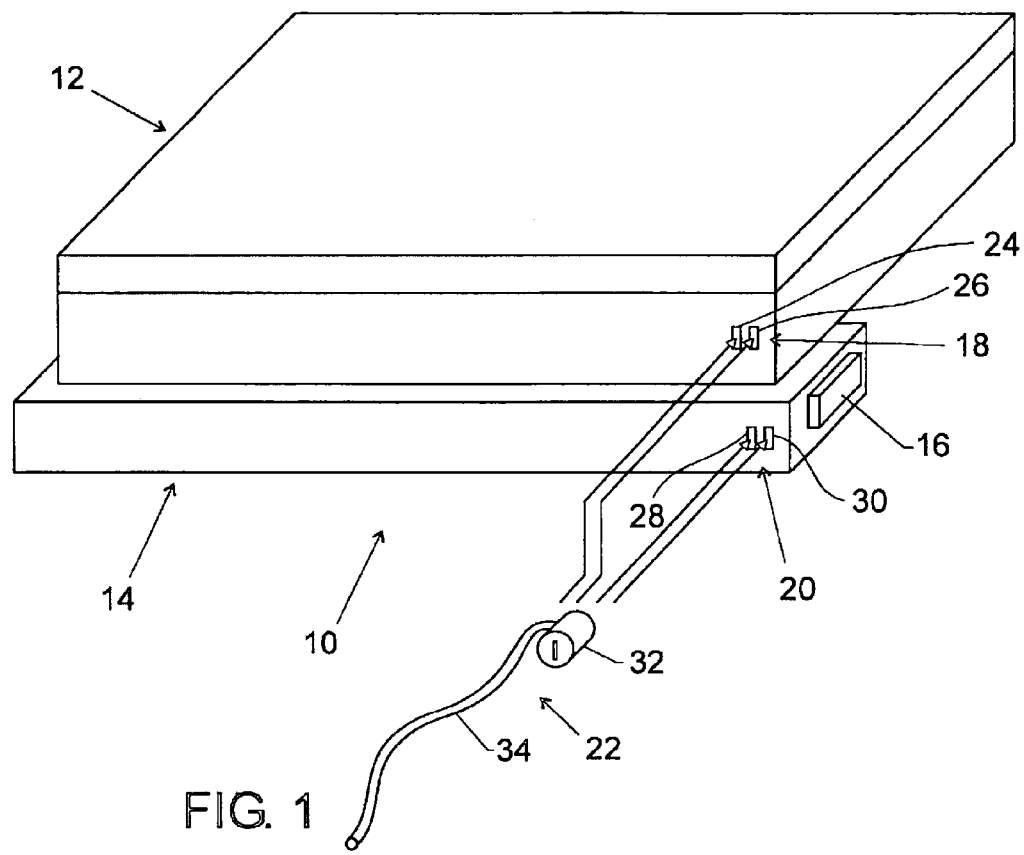
FIG. 1 is a perspective view of a computer system incorporating an exemplary multistage security mechanism of the present technique.

As illustrated in FIG. 1, the portable computing device 12 is coupled to the attachable expansion device 14, which has a release 16 for an internal interlock mechanism disposed within the attachable expansion device 14. At least one of the portable computing device 12 and the attachable expansion device 14 also has a multistage security mechanism, such as multistage security mechanisms 18 and 20, respectively. The multistage security mechanisms 18 and 20 provide the option of physically securing either one or both of the portable computing device 12 and the attachable expansion device 14 to an external fixture, such as a desk. For example, each of the multistage security mechanisms 18 and 20 may comprise a plurality of ports (e.g., Kensington-type ports), which are separately interlockable with a physical locking mechanism 22. In this exemplary environment, the multistage security mechanism 18 has lock ports or slots 24 and 26, while the multistage security mechanism 20 has lock ports or slots 28 and 30. Each of these slots 24, 26, 28, and 30 are separately interlockable with a lock structure 32 (e.g., a Kensington-type lock), which has a cable 34 for securement with the desired external fixture.

Figure 2:
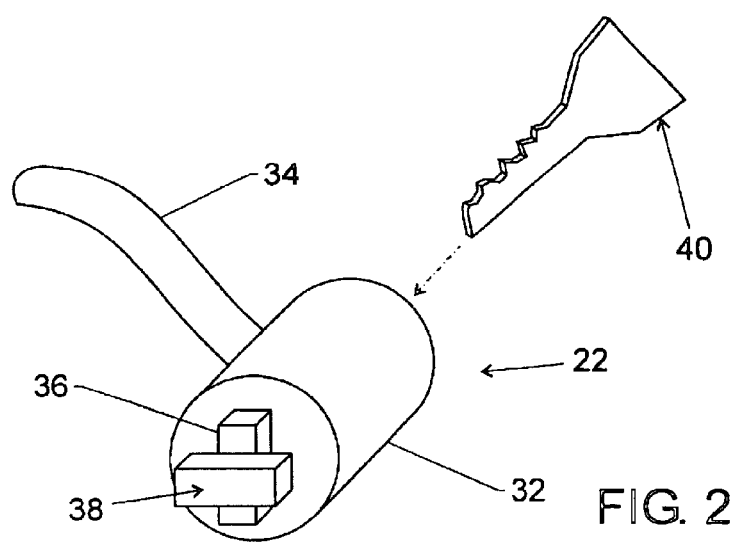
FIG. 2 is a perspective view of an exemplary lock structure engageable with multiple ports of the multistage security mechanism.

As illustrated by FIG. 2, the lock structure 32 has a fixed protruding member 36 and a rotatable catch or hook member 38, which is rotatable by insertion and rotation of a key 40. In operation, a user aligns the hook member 38 with the fixed protruding member 36 and inserts the two members 36 and 38 into a desired one of the slots 24, 26, 28, and 30. In the slot, the fixed protruding member 36 prevents rotational movement of the lock structure 32 relative to the slot. The user then turns the key 40 to rotate the hook member 38 relative to the slot and the fixed protruding member 36. Accordingly, the hook member 38 abuts an inner surface of the device (e.g., either the portable computing device 12 or the attachable expansion device 14) to prevent outward removal of the lock structure 32 from the slot. As discussed in further detail below, at least one slot in each multistage security mechanism 18 and 20 comprises an internal lockdown mechanism, or release lock, which disables the release 16 to prevent detachment of the portable computing device 12 and the attachable expansion device 14 via the release 16.

Although the multistage security mechanism may be disposed in either the portable computing device 12 or the attachable expansion device 14, the present security techniques are illustrated with reference to the multistage security mechanism 20 of the attachable expansion device 14. FIGS. 3 and 4 are bottom and top perspective views illustrating an exemplary embodiment of the attachable expansion device 14 having the multistage security mechanism 20. As illustrated by FIG. 3, the attachable expansion device 14 comprises a variety of expansion ports, such as input/output ports 42–70. These expansion ports 42–70 may comprise PS/2 ports, parallel ports, serial ports, monitor ports, audio/video ports, USB ports, wireless ports, optical ports, modem ports, network ports, or any other desired communication ports. As discussed above, the attachable expansion device 14 also may comprise a variety of expansion components and circuitry.

As illustrated by FIG. 4, the attachable expansion device 14 comprises a dockable communication port 72 and a pair of mechanical attachment structures 74, which are moveably coupled to the release 16 (e.g., buttons on opposite sides of the expansion device 14). As illustrated, the mechanical attachment structures 74 have device hooks or latches 75, which are disposed about the dockable communication port 72. The dockable communication port 72 is connectable with a mating communication port disposed on the portable computing device 12. The mechanical attachment structures 74 are also connectable with mating mechanical structures disposed on the portable computing device 12. Accordingly, the attachment structures 74 physically interlock the portable computing device 12 to the attachable expansion device 14 until the release 16 is engaged to withdraw, or release, the attachment structures 74 from the mating mechanical structures on the portable computing device 12.

Figure 5:
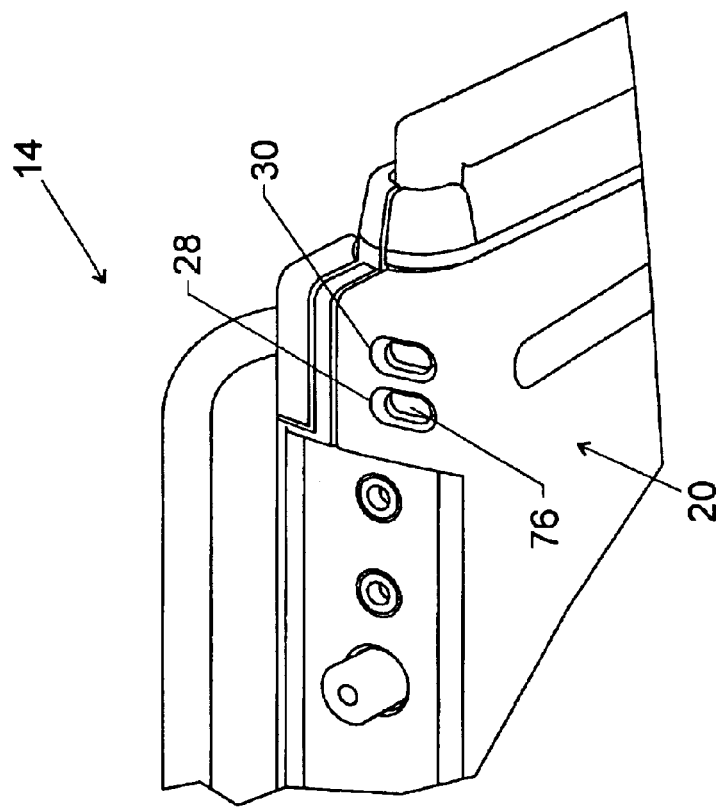
FIG. 5 is a partial rear perspective view of the attachable expansion device illustrating an internal lockdown mechanism disposed in one of the multiple ports.

In this exemplary embodiment, the attachable expansion device 14 includes the multistage security mechanism 20 for securing the device 14 to an external fixture and for selectively locking the release 16 for the mechanical attachment structures 74. FIG. 5 is a partial perspective view of the attachable expansion device 14 illustrating the lock ports or slots 28 and 30 of the multistage security mechanism 20. As discussed above, the slots 28 and 30 are separately engageable by the lock structure 32 to secure the attachable expansion device 14 to the desired external fixture. This may be defined as a first-stage of the multistage security mechanism. However, as discussed in further detail below, the slot 28 also has an internal lockdown mechanism 76, which locks the release 16 upon insertion of the lock structure 32 into the slot 28. This internal lockdown mechanism 76 provides a second-stage of security for the computer system 10, thereby allowing either separate or joint physical lockdown of the portable computing device 12 and the attachable expansion device 14 using a single security structure (i.e., the multistage security mechanism 20).

Figure 6:
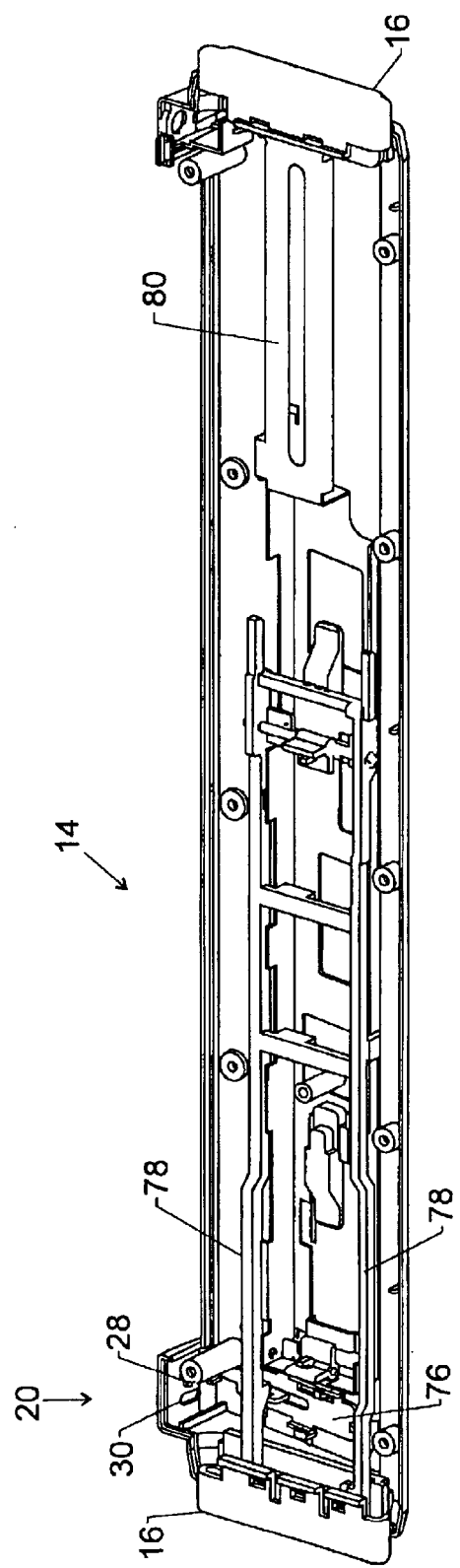
FIG. 6 is an internal perspective view of the attachable expansion device illustrating the interaction between the internal lockdown mechanism and a mechanical attachment/eject mechanism, which releasably couples the attachable expansion device to a portable computing device.

The internal interaction between the release 16, the mechanical attachment structures 74, and the internal lockdown mechanism 76 is illustrated by FIG. 6, which is an internal perspective view of the attachable expansion device 14. As illustrated, the releases 16 (i.e., left and right release buttons) are coupled to the mechanical attachment structures 74 (e.g., left and right attachment structures) via attachment/eject linkages 78 and 80, respectively. As a user presses the releases 16, the attachment/eject linkages 78 and 80 move inwardly within the attachable expansion device 14 to release the mechanical attachment structures 74. However, this inward release motion may be disabled by the internal lockdown mechanism 76. As a user inserts the lock structure 32 into the slot 28 of the multistage security mechanism 20, the hook member 38 engages and pushes the internal lockdown mechanism 76 into locking engagement with both of the attachment/eject linkages 78 and 80. This locking engagement by the hook member 38 prevents the foregoing release motion of the linkages 78 and 80.

Figure 7:
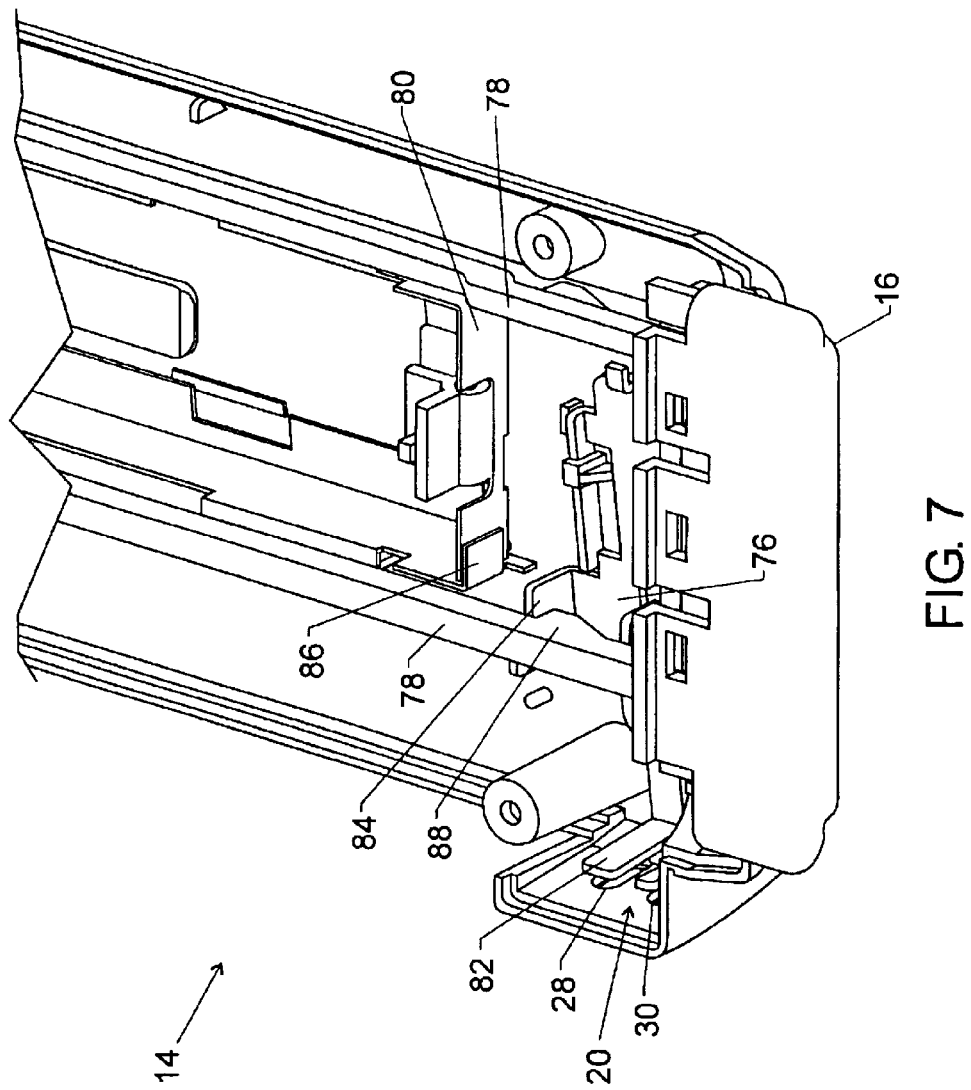
FIG. 7 is a partial internal perspective view of the attachable expansion device illustrating a locking engagement of the internal lockdown mechanism with linkages of the mechanical attachment/eject mechanism.

A detailed illustration of the internal lockdown mechanism 76 is provided by FIG. 7, which is a partial internal perspective view of the attachable expansion device 14. As illustrated, the internal lockdown mechanism 76 has a trigger tab 82 disposed adjacent the slot 28 to facilitate lateral movement of the internal lockdown mechanism 76 as the lock structure 32 is inserted into the slot 28. As the lock structure 32 forces the internal lockdown mechanism 76 to move laterally within the attachable expansion device 14, the internal lockdown mechanism 76 positions a securement tab 84 between an end portion 86 of the attachment/eject linkage 80 and a catch structure 88 of the attachment/eject linkage 78. Accordingly, the securement tab 84 prevents movement of both attachment/eject linkages 78 and 80, thereby disabling the release 16 and securing the portable computing device 12 to the attachable expansion device 14. If the user desires release of the portable computing device 12 from the attachable expansion device 14, then the user may remove the lock structure 32 from the slot 28 to move the securement tab 84 out of locking engagement with the structures 86 and 88. Although not illustrated, the internal lockdown mechanism 76 also has a return spring to facilitate the foregoing unlocking movement of the internal lockdown mechanism 76 away from the structures 86 and 88. The user may then reinsert the lock structure 32 into the slot 30 for physical securement of the attachable expansion device 14 without the portable computing device 12.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the foregoing multistage security mechanisms and internal lockdown structure are applicable to a variety of docking attachment/release mechanisms, portable computers, docking stations, port replicators, and other devices. Moreover, the multistage security mechanism may comprise any number of lock ports having different internal lockdown mechanisms for various components of the system.

What is claimed is:

1. A security system for a portable computing system, comprising:
   a docking mechanism adapted to couple a portable device removably to an expansion device; and
   a multistage device securing structure disposed on one of the portable device and the expansion device, wherein the multistage device securing structure comprises:
      first and second mating structures interlockable with a device fastener securable to a fixture; and
      a lockdown mechanism disposed adjacent the second mating structure and moveable with insertion of the device fastener to a position that locks the docking mechanism.

2. The security system as recited in claim 1, wherein the first and second mating structures comprise slots.

3. The security system as recited in claim 2, wherein the slots comprise Kensington-type ports.

4. The security system as recited in claim 2, wherein the device fastener comprises a lock having a hook member interlockable with one of the slots.

5. The security system as recited in claim 1, wherein the lockdown mechanism comprises a catch structure that is moveable into a blocking relationship with a release mechanism of the docking mechanism.

6. The security system as recited in claim 1, wherein the portable device is a notebook computer.

7. The security system as recited in claim 1, wherein the portable device is a tablet computer.

8. The security system as recited in claim 1, wherein the docking mechanism comprises a device latch releasably interlockable with the portable device.

9. The security system as recited in claim 8, wherein a locking end structure of the device fastener is engageable with the lockdown mechanism exclusively in the second mating structure.

10. The security system as recited in claim 1, wherein the first mating structure embodies a first locking stage for one of the portable device and the expansion device and, wherein the second mating structure embodies a second locking stage for both the portable device and the expansion device.

11. A portable computer system, comprising:
   a portable computing device;
   an expansion base having a docking mechanism interlockable with the portable computing device; and
   a multistage securing structure disposed on one of the portable device and the expansion base, comprising:
      first and second mating structures interlockable with a device fastener securable to a fixture; and
      a lockdown mechanism disposed adjacent the second mating structure and moveable with insertion of the device fastener to a position that locks the docking mechanism.

12. The portable computer system as recited in claim 11, wherein the first and second mating structures comprise ports.

13. The portable computer system as recited in claim 12, wherein the ports comprise Kensington-type ports.

14. The portable computer system as recited in claim 13, wherein the lockdown mechanism comprises a catch structure that is moveable into a blocking relationship with a release mechanism of the docking mechanism.

15. The portable computer system as recited in claim 12, wherein the device fastener comprises a lock having a hook member interlockable with one of the ports.

16. The portable computer system as recited in claim 11, wherein the portable device is a tablet computer.

17. The portable computer system as recited in claim 11, wherein the first mating structure embodies a first locking stage for one of the portable device and the expansion device and, wherein the second mating structure embodies a second locking stage for both the portable device and the expansion device.

18. An expansion device for a portable computing device, comprising:
   an expansion base, comprising:
      a docking mechanism interlockable with the portable computing device; and
      a multistage securing structure, comprising:
         first and second mating structures interlockable with a device fastener securable to a fixture; and
         a lockdown mechanism disposed adjacent the second mating structure and moveable with insertion of the device fastener to a position that locks to the docking mechanism.

19. The expansion device of claim 18, wherein the docking mechanism comprises a latch and release assembly.

20. The expansion device of claim 18, wherein the first and second mating structures comprise openings.

21. The expansion device of claim 20, wherein the openings comprise Kensington-type slots.

22. The expansion device of claim 18, wherein the lockdown mechanism comprises a catch structure that is moveable into a blocking relationship with a release mechanism of the docking mechanism.

23. The expansion device of claim 18, wherein the device fastener comprises a physical securement cable having an end-lock interlockable with one of the ports.

24. The expansion device of claim 18, wherein the first mating structure embodies a first locking stage for the expansion device and, wherein the second mating structure embodies a second locking stage for both the portable device and the expansion device.

25. A method of forming a multistage security system for a portable computing system comprising a portable device attachable to an expansion device via a docking mechanism, comprising the acts of:

providing a plurality of device-to-fixture fastening ports for an interlock structure on one device of the portable device and the expansion device; and providing a releasable lockdown mechanism movable to a position that locks the docking mechanism by engagement of the interlock structure with a desired one of the plurality of device-to-fixture fastening ports.

26. The method of claim 25, wherein the act of providing the plurality of device-to-fixture fastening ports comprises the act of forming fixed slots.

27. The method of claim 26, wherein the act of forming the fixed slots comprises the act of providing multiple lock receptacles for a lock-end of a device-to-fixture fastener.

28. The method of claim 25, wherein the act of providing the plurality of device-to-fixture fastening ports comprises the act of forming multiple Kensington ports.

29. The method of claim 25, wherein the act of providing the plurality of device-to-fixture fastening ports comprises the act of providing a plurality of device-to-fixture fastening stages for the portable device and the expansion device.

30. The method of claim 29, wherein the act of providing the plurality of device-to-fixture fastening stages comprises the acts of:

forming a first fastening port for the interlock structure on the expansion device to secure the expansion device; and forming a second fastening port for the interlock structure on the expansion device to secure both the portable device and the expansion device.

31. The method of claim 30, wherein the act of forming the second fastening port comprises the act of positioning the releasable lockdown mechanism adjacent the second fastening port.

32. The method of claim 31, wherein the act of positioning the releasable lockdown mechanism comprises the act of generating a triggering mechanism for the releasable lockdown mechanism exclusively in the second fastening port.

33. A method of multistage security for a portable computing system comprising a portable device attachable to an expansion device via a docking mechanism, comprising the acts of:

coupling a device-to-fixture lock assembly to a first port of an internal security structure of the expansion device to secure the expansion device; and alternatively coupling the device-to-fixture lock assembly to a second port of the internal security structure of the expansion device to secure the expansion device and to move a lockdown mechanism into a locked position with the docking mechanism.

34. The method of claim 33, wherein the act of coupling the device-to-fixture lock assembly to the first port comprises the act of locking a hook member in the first port.

35. The method of claim 34, wherein the act of coupling the device-to-fixture lock assembly to the first port further comprises the act of securing a cable to an external fixture.

36. The method of claim 33, wherein the act of alternatively coupling the device-to-fixture lock assembly to the second port comprises the act of locking a hook member in the second port.

37. The method of claim 33, wherein the act of alternatively coupling the device-to-fixture lock assembly to the second port comprises the acts of:

securing a cable from the second port to an external fixture; and securing the portable device to the expansion device.

38. The method of claim 37, wherein the act of securing the portable device comprises the act of disabling a release mechanism for the docking mechanism.

39. A docking system, comprising:

a housing, comprising:
   a dockable communication connector;
   a mechanical docking connector;
   a release mechanism coupled to the mechanical docking connector;
   a first security receptacle adapted to receive a security lock having a cable;
   a second security receptacle adapted to receive the security lock;
   a release locking member disposed adjacent the second security receptacle and the release mechanism, wherein the release locking member is movable to a position that locks the release mechanism with insertion of the security lock into the second security receptacle.

40. The docking system of claim 39, wherein the release mechanism comprises a pair of release actuators disposed on opposite sides of the housing.

41. The docking system of claim 39, wherein the mechanical docking connector comprises a pair of latches disposed about the dockable communication connector.

* * * * *